US012801201B2

(12) United States Patent
Wood et al.

(10) Patent No.: US 12,801,201 B2
(45) Date of Patent: *Nov. 17, 2026

(54) DYNAMIC BATTERY BACK-UP FOR SET-TOP-BOXES

(71) Applicant: Roku, Inc., San Jose, CA (US)

(72) Inventors: Anthony John Wood, Palo Alto, CA (US); Wade Charles Brown, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/896,494

(22) Filed: Sep. 25, 2024

(65) Prior Publication Data

US 2025/0021151 A1 Jan. 16, 2025

Related U.S. Application Data

(63) Continuation of application No. 18/132,478, filed on Apr. 10, 2023, now Pat. No. 12,141,009, which is a continuation of application No. 16/834,095, filed on Mar. 30, 2020, now Pat. No. 11,625,085.

(51) Int. Cl.

| | |
|---|---|
| ***G06F 1/32*** | (2019.01) |
| ***G06F 1/3225*** | (2019.01) |
| ***H02J 7/50*** | (2026.01) |
| ***H02J 9/04*** | (2006.01) |
| ***H04N 21/40*** | (2011.01) |

(52) U.S. Cl.

CPC ............ *G06F 1/3225* (2013.01); *H02J 7/575* (2026.01); *H02J 9/04* (2013.01); *H04N 21/40* (2013.01)

(58) Field of Classification Search

CPC .................................... G06F 1/32; G06F 9/44

See application file for complete search history.

(56) References Cited

U.S. PATENT DOCUMENTS

| | | | | |
|---|---|---|---|---|
| 10,393,552 | B1 * | 8/2019 | Cazzaniga | G01D 3/02 |
| 11,625,085 | B2 | 4/2023 | Wood et al. | |
| 2011/0060929 | A1 * | 3/2011 | Park | G06F 1/3209 713/323 |
| 2014/0040518 | A1 * | 2/2014 | Udipi | G06F 13/1605 710/117 |
| 2018/0225272 | A1 | 8/2018 | Kadgi et al. | |
| 2019/0086994 | A1 | 3/2019 | Regupathy et al. | |
| 2021/0240242 | A1 | 8/2021 | Suzuki | |
| 2023/0315186 | A1 | 10/2023 | Wood et al. | |

* cited by examiner

*Primary Examiner* — Keshab R Pandey

(74) *Attorney, Agent, or Firm* — Sterne, Kessler, Goldstein & Fox P.L.L.C.

(57) ABSTRACT

Disclosed herein is a dynamic backup battery for updating the firmware of a media device. The media device includes a memory device that is electrically coupled to a port. The port of the media device is configured to receive a first power. The media device also includes a battery that is electrically coupled to the port and is configured to supply a second power to the port. The media device includes a processor electrically coupled to the battery and is configured to monitor the power level of the first power received and based on the power level of the first power received falling below a threshold value, the battery supplies a second power to the port of the media device. The processor is further configured to activate a low power mode, detect an event while in low power mode, deactivate low power mode, perform a task, and reactivate low power mode.

20 Claims, 15 Drawing Sheets

102

202

202

202

602

DYNAMIC BATTERY BACK-UP FOR SET-TOP-BOXES

CROSS-REFERENCE TO RELATED APPLICATIONS

This application is a continuation of U.S. patent application Ser. No. 18/132,478, filed Apr. 10, 2023, which is a continuation of U.S. patent application Ser. No. 16/834,095, filed on Mar. 30, 2020, the contents of which are incorporated herein by reference in their entireties.

BACKGROUND

Field

This disclosure is generally directed to updating a set-top box using a dynamic backup battery.

Background

In today's world, on-demand availability of content—such as movies, TV shows and music, to name just a few examples—is commonplace. But the electronic and computerized storage and delivery of content offers the potential for far more than just the availability and vanilla playback of content. For example, through innovative use of technology, it is possible to generate content recommendations that are tailored for individual users, as well as to customize the viewing experience to each user's personal preferences.

But, existing media systems and services still fall short in many areas. For example, many media systems and services require users to sit and wait as existing media systems update the firmware of the device. Also, too often, the user's media system is unable to operate on the most current firmware without interrupting the user's viewing experience with a firmware update.

Similarly, existing media systems require the user to leave the external power source of the media system powered on to update the firmware of the media system. This may lead to a higher electric bill and inefficient power consumption.

SUMMARY

Provided herein are system, apparatus, article of manufacture, method and/or computer program product embodiments, and/or combinations and sub-combinations thereof, for using technology in innovative ways to provide enhanced media streaming functionality.

An embodiment of the present disclosure is directed to updating the firmware of an apparatus using a backup battery. In a non-limiting embodiment, the apparatus may be a media device. The media device includes a memory device that is electrically coupled to a port. The port of the media device is configured to receive power in order to power the media device. The media device also includes a battery that is electrically coupled to the port. The battery is configured to supply power to media device in the event that the media device is no longer receiving power from an external device. The media device includes a processor electrically coupled to the battery and is configured to monitor the power level of the power received by the media device. Based on the power level, the media device will determine if the power received has fallen below a threshold value. If the media device has determined that the power received has fallen below the threshold value, the battery will supply power to the port of the media device.

The processor of the media device is further configured to enter a low power mode if the power level received by the media device falls below the threshold value. While in the low power mode, the processor monitors the activity of various program routines or subroutines to detect various events. These events trigger the processor to deactivate the low power mode, which allows the media device to perform various tasks. Once the task is performed, the processor of the media device will reenter low power mode to save energy.

Another embodiment is directed to scheduling, downloading, and installing an update to the firmware of a media device using a backup battery. When updating the firmware, the media device will receive a request from a update server identifying that the media device's firmware is out of date and needs to be updated. Once the media device receives an update request, the media device will then schedule the update for an available period. An available update period is scheduled based on a viewing schedule. The media device determines a viewing schedule by analyzing the viewing patterns of the user and the activity of the media device. After the update period is scheduled, the media device will detect the update period, download the firmware update from the update, and install the firmware update on the media device.

Another embodiment is directed to scheduling, downloading, and installing an update to the firmware of an apparatus using a backup battery while in a low power mode. The media device can activate low power mode to save power during periods of inactivity or based on the viewing schedule. While in the low power mode, the media will monitor various software routines to detect various events. One such even is the receipt of a update request from an update server. After the media device detects that the update request is received, the media device will then perform the task of scheduling the downloading and installation of the update to occur during an update period. The media device determines the update period based the viewing schedule. The viewing schedule is determined by the viewing pattern of the user. If the scheduled update period is greater than a set amount of time away from the receipt of the update request, the media device will reenter low power mode if the viewing schedule shows inactivity by the user. If the media device is in the low power mode, it will monitor software routines to detect the update period and perform the task of downloading a firmware update from an update server, and installing the firmware update on the media device.

Another embodiment is directed to updating the firmware of an apparatus using a backup battery. In a non-limiting embodiment, the apparatus may be a media device. The backup battery is disposed within a cable that connects the media device to a display device.

BRIEF DESCRIPTION OF THE FIGURES

The accompanying drawings are incorporated herein and form a part of the specification.

Figure 1:
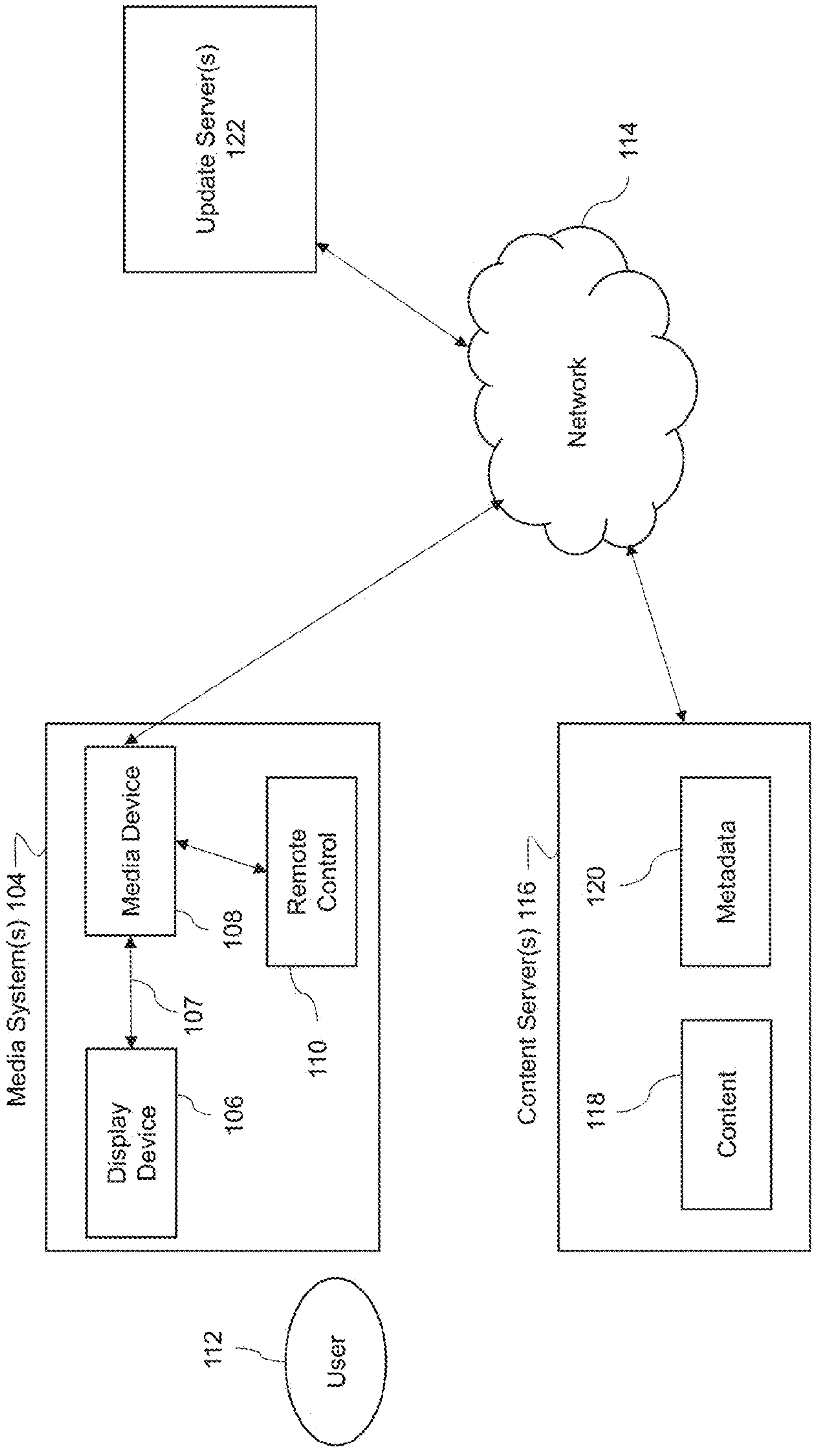
FIG. 1 illustrates a block diagram of a multimedia environment that includes one or more media systems and one or more content servers, according to some embodiments.

In the drawings, like reference numbers generally indicate identical or similar elements. Additionally, generally, the left-most digit(s) of a reference number identifies the drawing in which the reference number first appears. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment.

DETAILED DESCRIPTION

Multimedia Environment 102

FIG. 1 illustrates a block diagram of a multimedia environment 102, according to some embodiments. In a non-limiting example, multimedia environment 102 is directed to streaming media.

The multimedia environment 102 may include one or more media systems 104 and one or more content servers 116 communicatively coupled via a network 114. In various embodiments, the network 114 can include, without limitation, wired and/or wireless intranet, extranet, Internet, cellular, Bluetooth and/or any other short range, long range, local, regional, global communications network, as well as any combination thereof.

Media system 104 may include a display device 106, media device 108, and remote control 110. Display device 106 may be a monitor, television, computer, smartphone, tablet, and/or projector, to name just a few examples. Media device 108 may be a streaming media device, DVD device, audio/video playback device, cable box, and/or digital video recording device, to name just a few examples. In some embodiments, the media device 108 can be a part of, integrated with, operatively coupled to, and/or connected to display device 106 through cable 107. Cable 107 may be detachable. The media device 108 may communicate with network 114.

A user 112 may interact with media system 104 via remote control 110. Remote control 110 can be any component, part, apparatus or method for controlling media device 108 and/or display device 106, such as a remote control, a tablet, laptop computer, smartphone, on-screen controls, integrated control buttons, or any combination thereof, to name just a few examples.

Content servers 116 may each include databases to store content 118 and metadata 120. Content 118 may include any combination of music, videos, movies, TV programs, multimedia, images, still pictures, text, graphics, gaming applications, advertisements, software, and/or any other content or data objects in electronic form. In some embodiments, metadata 120 comprises data about content 118. For example, metadata 120 may include associated or ancillary information indicating or related to writer, director, producer, composer, artist, actor, summary, chapters, production, history, year, trailers, alternate versions, related content, applications, and/or any other information pertaining or relating to the content 118. Metadata 120 may also or alternatively include links to any such information pertaining or relating to the content 118. Metadata 120 may also or alternatively include one or more indexes of content 118, such as but not limited to a trick mode index.

Update servers 122 may each include a processor and databases that store firmware updates. The update servers 122 may be communicatively coupled via network 114 to the media system 104 and the content servers 116. The update servers 122 may communicate with the media device 108 to "push" firmware updates out over the network 114. For example, the update servers 122 may issue a request to the media device 108 to update the firmware of the media device 108. Alternatively, the update servers 122 may receive, from the media device 108, a request to update the firmware of the media device 108. In an alternate embodiment, the content servers 116 may perform the tasks of the update servers 122 (that is, in some cases, the content servers 116 and update servers 122 may be the same devices).

Media Device 108

Figure 2A:
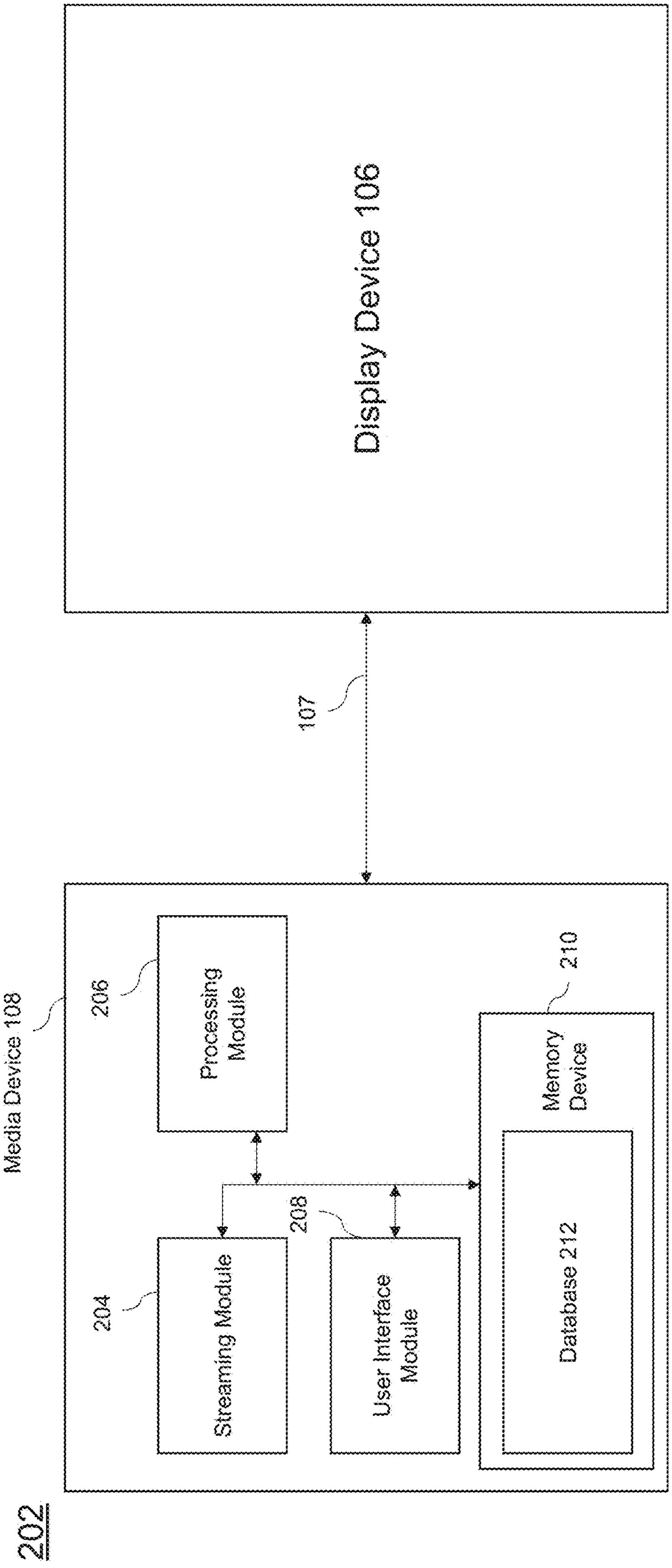
FIG. 2A illustrates a block diagram of a media device, according to some embodiments.

FIG. 2A illustrates an example block diagram of the media device 108, according to some embodiments. Media device 108 may include a streaming module 204, processing module 206, user interface module 208 and memory device 210. The memory device 210 is configured to store any user 112 settings or instructions that, when executed by the processing module 206, cause the media device 108 to perform the functions detailed throughout this disclosure. The memory device 210 also includes a database 212. Any of the streaming module 204, the processing module 206, or the user interface module 208 may be implemented using processor circuitry, software, or any combination thereof.

Now referring to FIGS. 1 and 2A, in some embodiments, user 112 may use remote control 110 to interact with the user interface module 208 of media device 108 to select content, such as a movie, TV show, music, book, application, game, etc. The streaming module 204 of media device 108 may request the selected content from content server(s) 116 over the network 114. Content server(s) 116 may transmit the requested content to the streaming module 204. Media device 108 may transmit the received content to display device 106 for presentation to user 112. In streaming embodiments, the streaming module 204 may transmit the content to display device 106 in real-time or near real-time as it receives such content from content server(s) 116. In non-streaming embodiments, media device 108 may buffer or store the content received from content server(s) 116 in database 212 for later playback on display device 106.

In some embodiments, the user interface module 208 may determine a viewing schedule based on the viewing patterns of the user 112. The viewing patterns of the user 112 represents a database stored in the memory device 210, which corresponds to when the user 112 has historically used the media device 108 in the past and/or when the user 112 is predicted to use the media device 108 in the future. The viewing schedule may be referenced to determine a period where the media device 108 is inactive. The user interface module 208 may determine the viewing patterns of the user 112 by, at any time, monitoring whether the streaming module 204 is streaming content 118, by determining if the media device 108 is inactive, and by determining if the media device 108 is predicted to be inactive.

The streaming module 204 may provide inactivity information (that is, information that indicates whether the media device 108 is inactive) to the user interface module 208 based on the streaming status of the streaming module 204 or media device 108. The streaming module 204 may determine the streaming status of the streaming module 204 or the media device 108 by monitoring whether the content servers 116 are transmitting content 118 to the streaming module 204.

In other embodiments, the streaming module 204 may determine the steaming status by monitoring various audio/visual data streams received from the content server 116 and compare these audio/visual data streams with data stored in the memory device 210. The streaming module 204 may also compare the audio/visual data streams with a live feed of data received from either the display device 106 or the remote control 110. For example, in some embodiments, the remote control 110 may include an audio capturing device, such as a microphone. In this embodiment, the streaming module 204 may compare the audio data stream received by the remote control 110 to the audio data stream received either by the content servers 116 or to the audio data stream communicated to the display device 106.

In other embodiments, the user interface module 208 may determine if the media device 108 is inactive by monitoring if the display device 106 is powered on by monitoring the signal communicated between the display device 106 and the media device 108. For example, the user interface module 208 can detect the inactivity of the media device 108 by using the hotplug detect function of HDMI, DisplayPort, or DVI to determine if the display device 106 has power.

In some embodiments, the user interface module 208 may also monitor if the media device 108 has received a user 112 input within a set period. The user interface module 208 may store data related to the inputs made by the user 112, such as the type, time, and frequency. For example, the user interface module 208 may monitor and store in the memory device 210, various inputs received by the user 112, such as keypresses or voice commands made on the remote control 110. For example, the user interface module 208 may determine that the user 112 has stopped using the media device 108 after 4 hours have passed without receiving a keypress or voice command. In some embodiments, the period required to determine inactivity may be configured by the user 112 or hardcoded within the processor circuitry of the media device 108. The period required to determine inactivity may range from 3-4 hours.

In some embodiments, the user interface module 208 may query the user 112 by displaying a screen saver on the display device 106 after the required period to determine inactivity has passed. The screen saver may require the user 112 to provide an affirmative input to the media device 108 to resume the streaming of content 118. For example, after detecting no activity for over 4 hours, the media device 108 displays on the display device 106 a screen saver asking, "Are you still there?" and providing the user 112 with an option of choosing "yes" and/or "no." If the user 112 affirmatively selects "yes" using the remote control 110, the screen saver is removed from the display device 106, and the media device 108 continues streaming content 118. If the user 112 does not affirmatively select "yes" then the user interface module 208 logs the inactivity and stores this data in the memory device 210 as well as ending the streaming of content 118.

In some embodiments, the user interface module 208 may use the inactivity data stored within the memory device 210 to predict the future viewing patterns for the user 112. The future viewing patterns may consider variables, such as the time of day, the day of the week, the month, etc. The future viewing pattern may also consider variables based on the content 118, such as, whether a new tv show or movie is scheduled for release or a new season of the user 112's favorite tv show was just release. The future viewing patterns may also consider variables, such as how the user 112 consumes the content 118. For example, the future viewing patterns may allocate more time when new content 118 is released because the user 112 tends to consume the content 118 very quickly after new content 118 has been released, otherwise known as binge-watching. The future viewing patterns may also consider variables, such as integrated calendars, upcoming planned trips, type of services or channels subscribed to, age, etc. A person having ordinary skill in the art would understand that any of these variables can be stored in a user profile or accessed via connecting the user 112's profile with various third-party accounts. For example, connecting the user 112 profile to the user 112's google account to access email, calendar, etc.

In some embodiments, the display device 106 powers the media device 108. That is, the display device 106 provides the power necessary to accomplish the various functions of the media device 108. The display device 106 can provide power wirelessly or through a wired connection such as cable 107. As further discussed below, the cable 107 may only provide power to media device 108, or the cable 107 may be capable of transmitting/receiving both power and data. Furthermore, cable 107 may be detachable.

In some embodiments, the display device 106 may include a wireless power transceiver that provides power to the media device 108. The display device 106, or the media device 108, may transmit/receive power according to various wireless power standards, such as Qi (100 kHz-205 kHz), PMA (250 kHz-400 kHz), Rezence (6.78 MHz), etc. The benefit of this embodiment is the elimination of cords, which may otherwise prevent the display device 106 from mounting flush against the wall.

In some embodiments, the display device 106 may provide power and/or data to the media device 108 wirelessly. That is, the display device 106 provides the power and/or data necessary to accomplish the various functions of the media device 108, such as content stream data. The display device 106, or the media device 108, may transmit/receive power according to various wireless power standards, such as Qi (100 kHz-205 kHz), PMA (250 kHz-400 kHz), Rezence (6.78 MHz), etc. While sending data over a wide range of communications protocols, such as WiFi (802.11b/g/n/ac, etc.), Bluetooth, Cellular (2G, 3G, 4G, 5G, etc), NFC, or any other wireless communications protocol that is capable of high enough data rates to stream audio and/or video content.

Figure 2B:
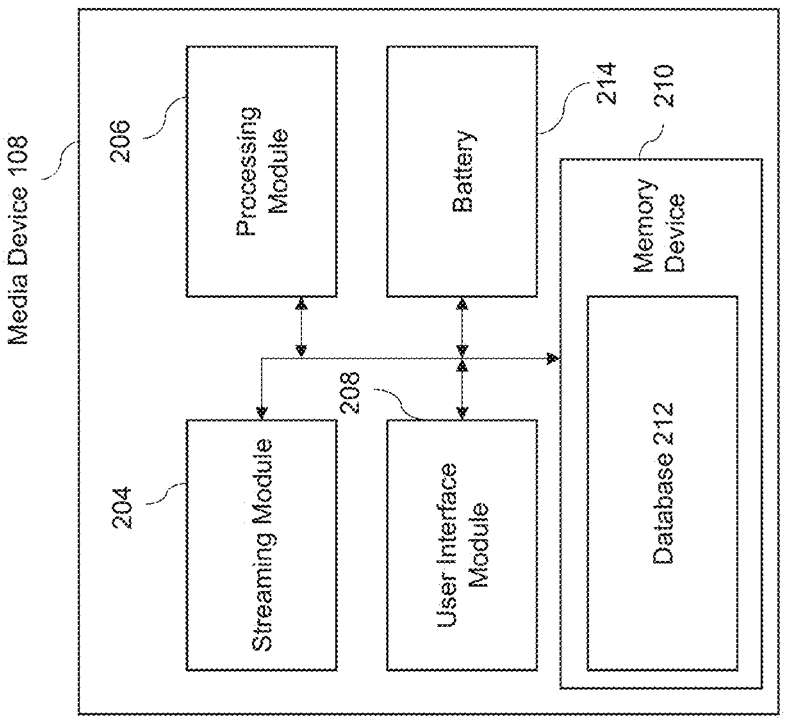
FIG. 2B illustrates a block diagram of a media device, including an internal battery, according to some embodiments.

FIG. 2B illustrates another block diagram of the media device 108, including a battery 214, according to an embodiment. The battery 214 may be rechargeable or non-rechargeable. Additionally, the battery 214 may include cells using any of the following compositions, such as lithium-ion, magnesium-ion, and/or alkaline, to name just some examples.

The battery 214 may supply power to the media device 108 when the display device 106 is not supplying power to the media device 108. The media device 108 may enter a low power mode when powered by only the battery 214. In some embodiments, the media device 108 may be able to operate in low power mode for between 24-48 hours while powered by the battery 214.

Figure 2C:
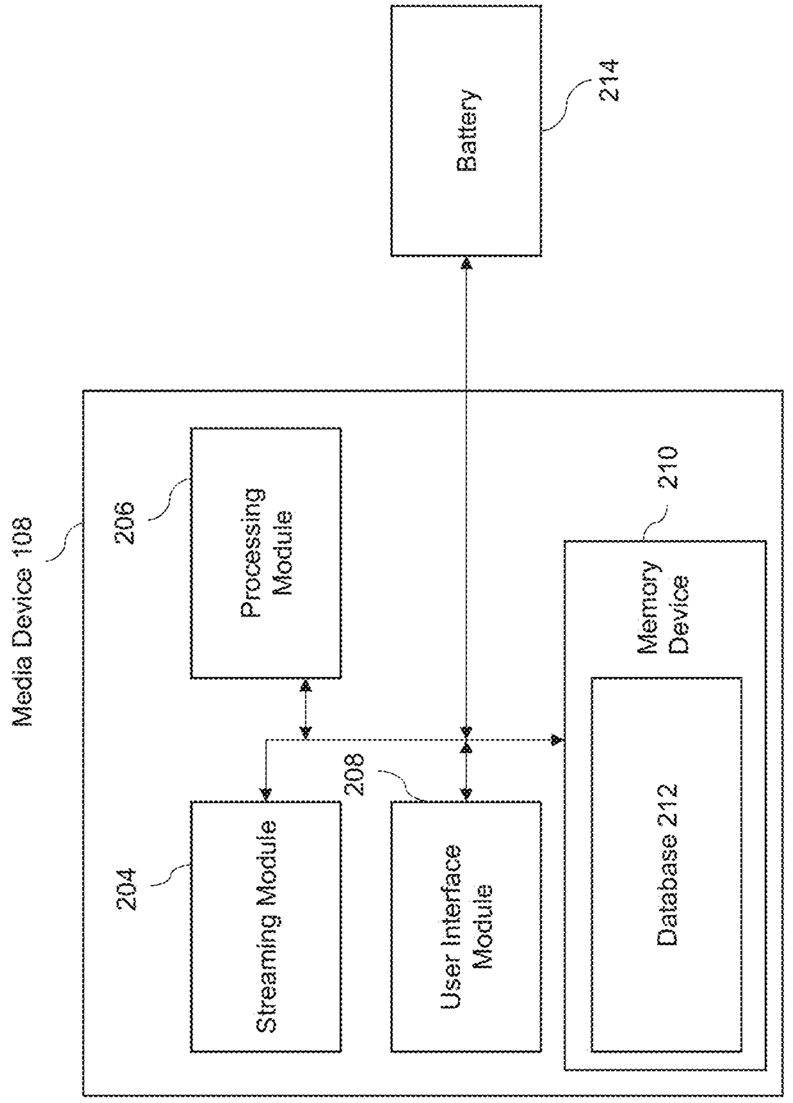
FIG. 2C illustrates a block diagram of a media device, including an external battery, according to some embodiments.

FIG. 2C illustrates another embodiment of the media device 108. In this embodiment, the battery 214 is an external power source.

Figure 2D:
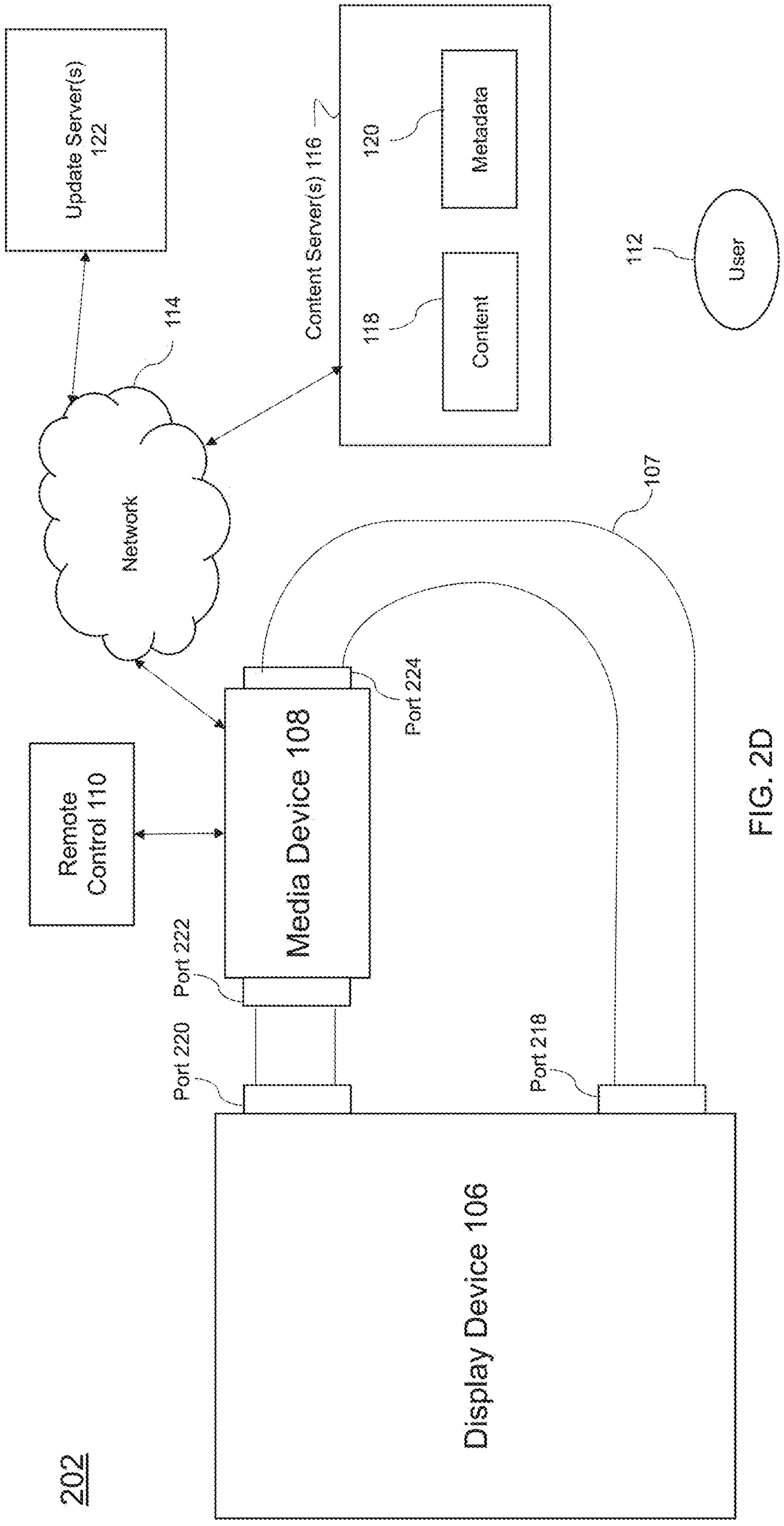
FIG. 2D illustrates a block diagram of a multimedia environment that includes a media device, according to some embodiments.

FIG. 2D further illustrates the multimedia environment 102. In this embodiment, the display device 106 is electrically coupled to the media device 108 through port 218 and port 220. The display device 106 provides power through port 218 and cable 107 to port 224 of the media device 108. The display device 106 may transmit/receive data using port 220, which is electrically coupled to port 222 of the media device 108.

Figure 2E:
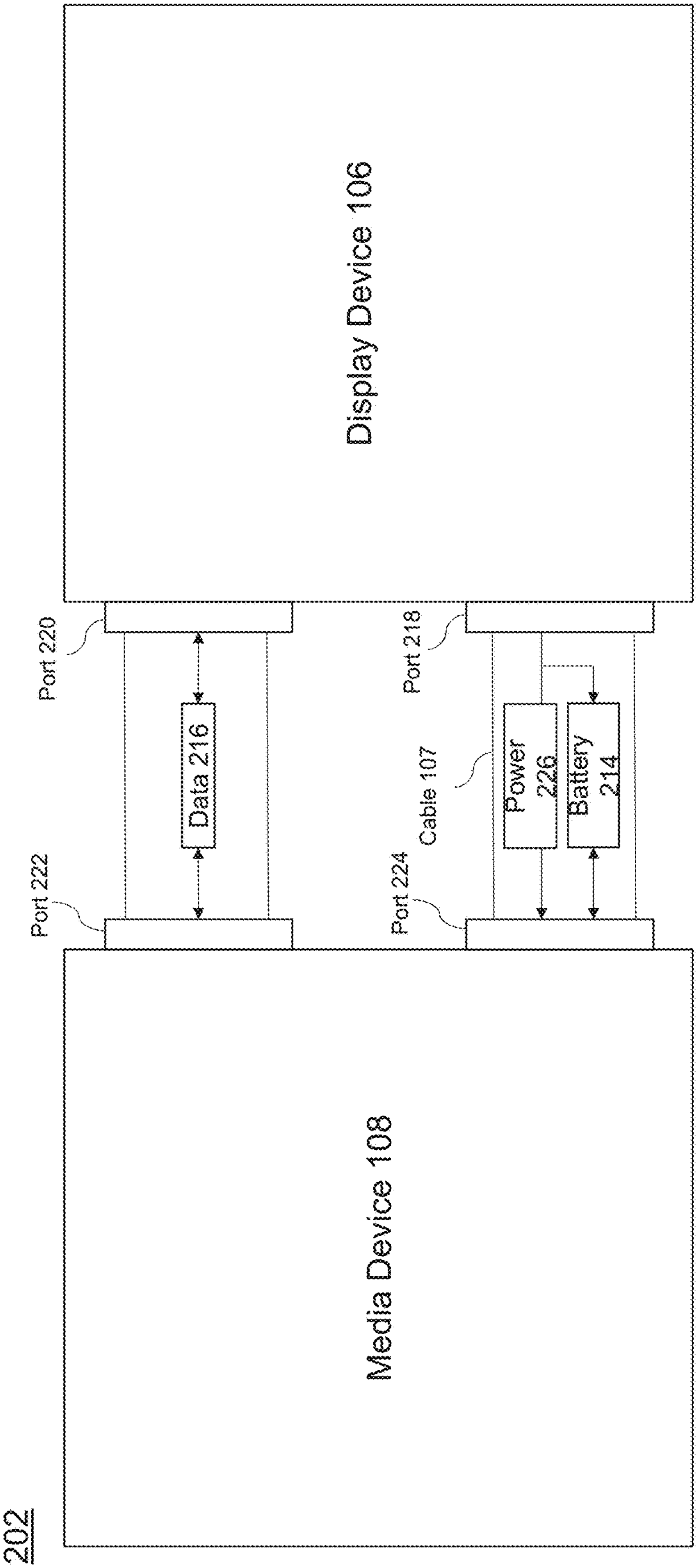
FIG. 2E illustrates a block diagram of a multimedia environment including a media device comprising an external battery disposed within a cable, according to some embodiments.

FIG. 2E illustrates another embodiment of the media device 108. In this embodiment, the battery 214 is disposed within a cable 107. The cable 107 is coupled to the media device 108 via port 224, and the display device 106 via port 218. In this embodiment, the display device 106 provides power 226 to the media device 108 through cable 107 and ports 218 and 224. The battery 214 may also be recharged by the display device 106 and/or media device 108. Also in this embodiment, the display device 106, or the media device 108, may transmit/receive data 216 through ports 220 and 222 through a connector such as HDMI, USB, VGA, etc. or through another cable 107.

In some embodiments, the cable 107 can be any type of cable that is capable of transmitting power, such as USB, USB-C, etc. It is advantageous to incorporate the battery 214 into the cable 107 to allow existing media devices 108 to be retrofitted with the features disclosed throughout this application.

In some embodiments, ports 220 and 220 are HDMI ports, although this disclosure is not limited to that example.

Figure 2F:
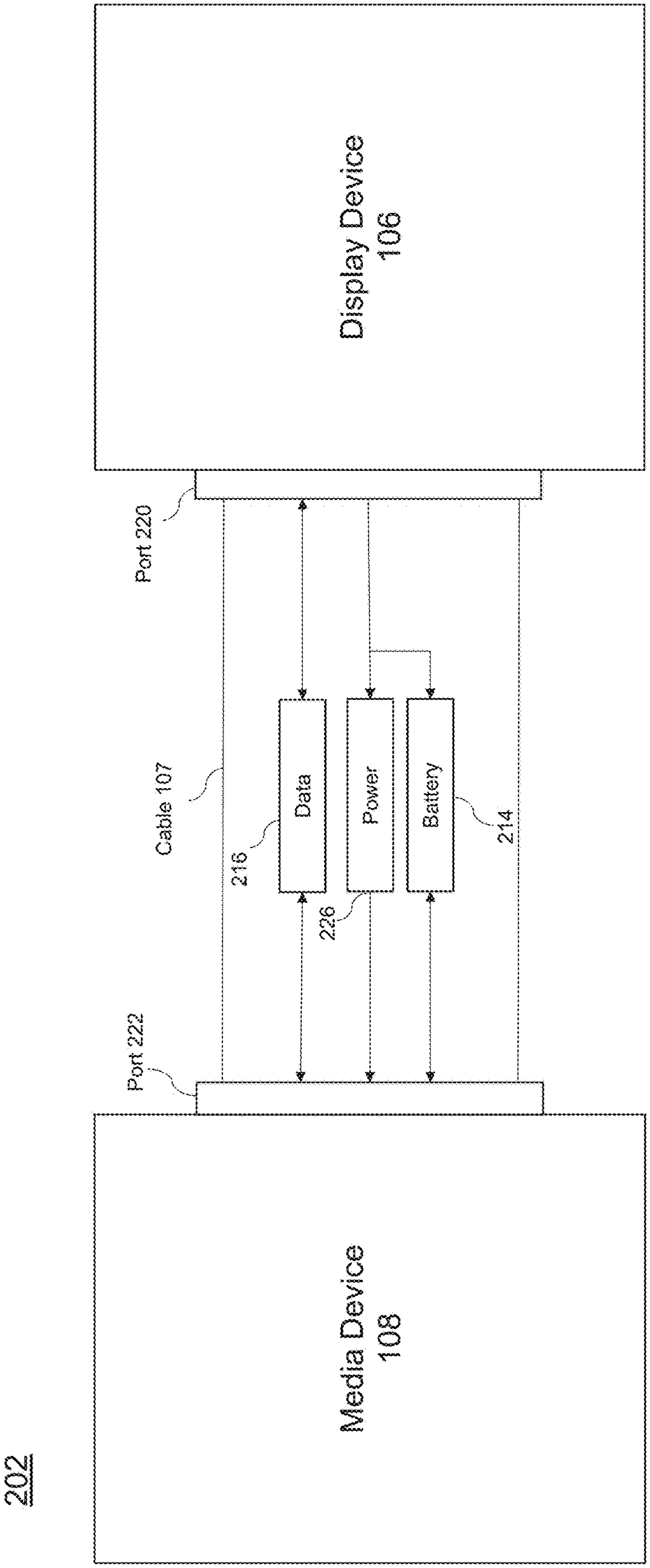
FIG. 2F illustrates a block diagram of a media device, including an external battery disposed within a cable that is capable of transmitting and receiving both data and power, according to some embodiments.

FIG. 2F illustrates another embodiment of the media device 108. In this embodiment, the battery 214 is disposed within a cable 107. The cable 107 is coupled to the media device 108 via port 222, and the display device 106 via port 220. In this embodiment, the display device 106 provides power 226 to the media device 108 through cable 107 and ports 220 and 222. The battery 214 may also be recharged by the display device 106 and/or media device 108. Also in this embodiment, the display device 106, or the media device 108, may transmit/receive data 216 via cable 107 through ports 220 and 222.

In this embodiment, the cable 107 can be any type of cable that is capable of transmitting and receiving both power and data, such as USB, USB-C, etc. This embodiment allows for the use of only one connection to the display device 106, which reduces the overall production costs for both the display device 106 and the media device 108. It is also advantageous to incorporate the battery 214 into the cable 107 to allow existing media devices 108 to be retrofitted with the features disclosed throughout this application.

In some embodiments, the battery 214 may be formed within a bead around the cable 107 or may be inline within the cable 107. The cable 107 is not limited to any particular type of cable and, therefore, can be any type of cable that can communicate data and/or transmit power, such as coaxial, fiber optic, USB, shielded, unshielded, etc Battery 214

Figure 3:
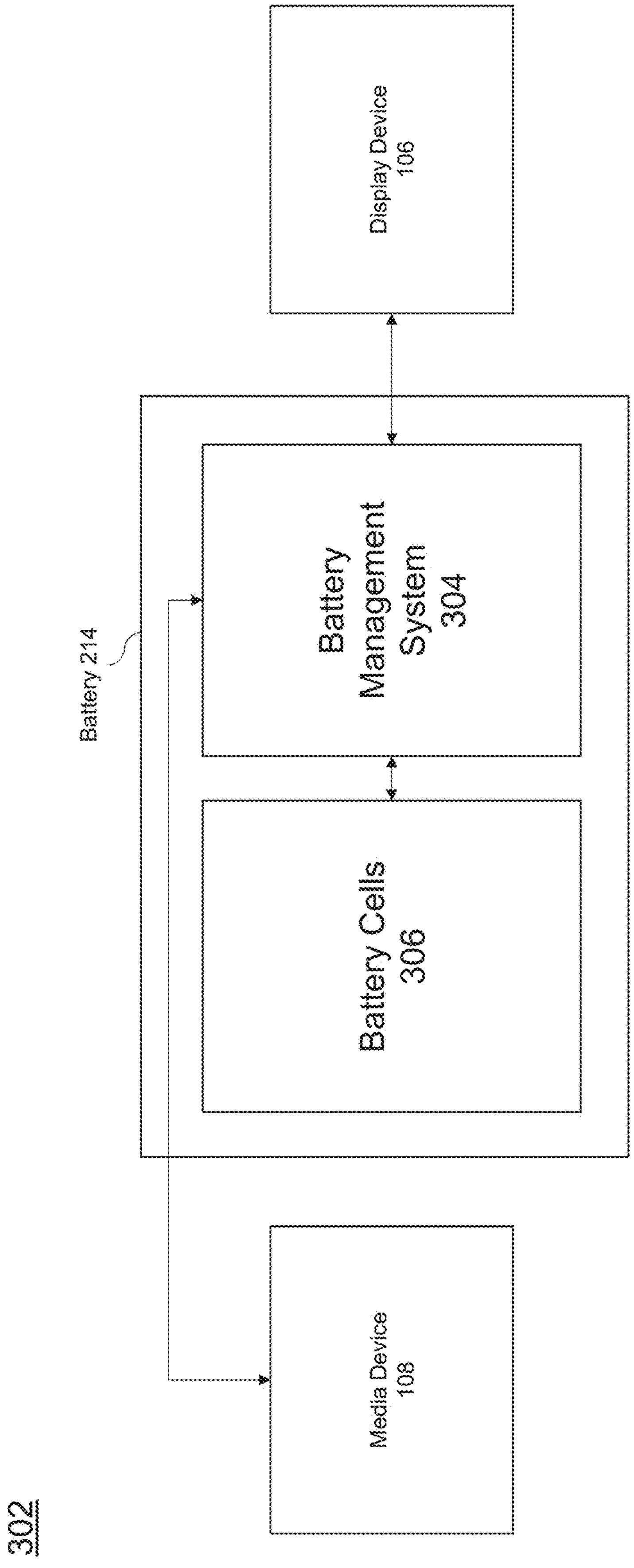
FIG. 3 illustrates a block diagram of a battery, according to some embodiments.

FIG. 3 illustrates a block diagram of the battery 214, according to some embodiments. The battery 214 includes one or more battery cells 306 that store electrical energy. The battery cells 306 may be rechargeable or non-rechargeable. Additionally, the battery cells 306 may be made of chemical composition that includes any of the following compositions, such as lithium-ion, magnesium-ion, alkaline, etc. The battery cells 306 are electrically coupled to a battery management system 304. The battery management system 304 is further electrically coupled to both the media device 108 and/or the display device 106.

In an alternate embodiment without a battery management system 304, the battery cells 306 are electrically coupled to the media device 108 and/or the display device 106. In this embodiment, either the cable 107, the media device 108, or the display device 106 may include a charging circuit.

In the embodiment where the display device 106 includes a charging circuit, the charging circuit may be implemented using a processor or other hardware capable of charging the battery 214. Similarly, in the embodiment where the cable 107 includes a charging circuit, the charging circuit may be implemented using a processor or other hardware capable of charging the battery 214.

In the embodiment where the media device 108 includes a charging circuit, the charging circuit may be implemented using any of the streaming module 204, the processing module 206, the user interface module 208, or the memory device 210. The charging circuit may receive power from the display device 106 and charge the one or more battery cells 306 of the battery 214.

Figure 4:
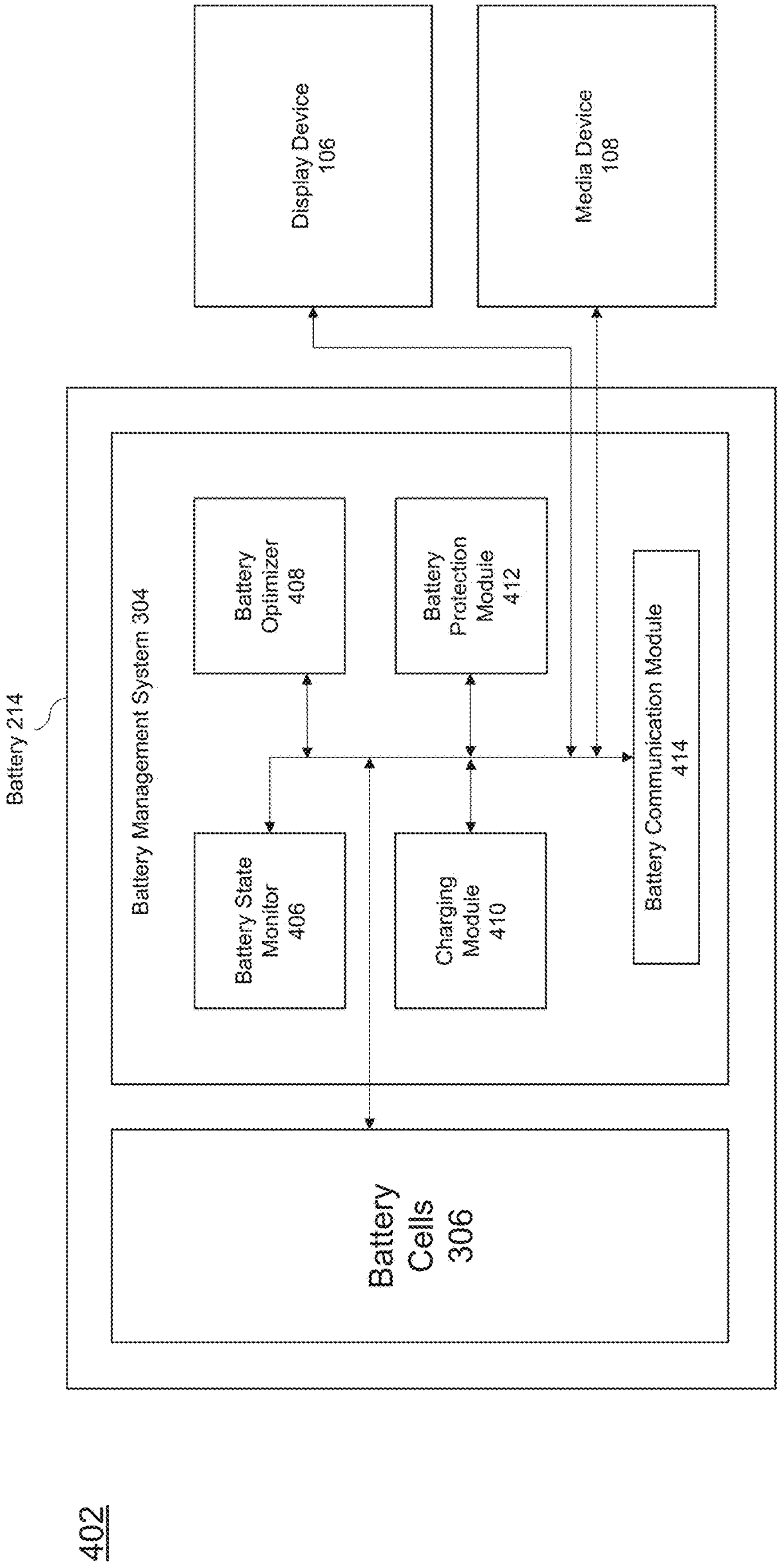
FIG. 4 illustrates a more detailed block diagram of a battery that includes a battery management system, according to some embodiments.

FIG. 4 illustrates a more detailed block diagram of the battery 214, according to some embodiments, that include a battery management system 304. The battery management system 304 includes a battery state monitor 406 that is electrically coupled to the battery cells 306, a battery optimizer 408, a charging module 410, a battery protection module 412, and a battery communication module 414. The battery communication module 414 is electrically coupled to each of the battery state monitor 406, the battery optimizer 408, the charging module 410, the battery protection module 412, the display device 106, and the media device 108. In some embodiments, the battery state monitor 406, the battery optimizer 408, the charging module 410, the battery protection module 412, and the battery communication module 414 may be implemented using a single processor.

In some embodiments, the battery management system 304 includes a battery state monitor 406 that may monitor various state parameters of the battery cells 306. The state parameters include, but are not limited to, the voltage, temperature, sate of charge (SOC), depth of discharge (DOD), state of health (SOH), state of power (SOP), state of safety (SOS), and current. The battery state monitor 406 also uses these state parameters to estimate the current state of the battery 214. Similarly, the battery state monitor 406 may calculate various secondary state parameters including, but not limited to, the total number of cycles used, the total number of cycles remaining, the charge delivered or stored, the internal impedance of a cell, the charge current limit, and the discharge current limit.

In some embodiments, the battery management system 304 includes a battery optimizer 408. The battery optimizer 408 may balance the battery cells 306 by maintaining the same voltage or SOC across the battery cells 306. The battery optimizer 408 maintains the same voltage of SOC by wasting energy, redistributing energy, reducing the charge current supplied to each cell, etc.

In some embodiments, the battery management system 304 also includes a charging module 410. The charging module 410 may charge the battery cells 306 from power received by the display device 106 or the media device 108. The charging module 410 may also limit the charging current supplied to the battery cells 306 depending on the state determined by the battery state monitor 406. By limiting the charging current, the charging module 410 ensures that the battery 214 is optimally charged. This allows for better overall battery health and allows the battery 214 to maintain its charge capacity longer.

In some embodiments, the battery management system 304 may include a battery protection module 412. The battery protection module 412 may protect the battery 214 from operating outside its intended safe operating zone. The battery protection module 412 may protect the battery 214 from over-current, over-voltage, under-voltage, over-temperature, overpressure, etc. The battery protection module 412 may communicate with the battery state monitor 406. The battery state monitor 406 supplies the information that the battery protection module 412 needs to calculate if the battery 214 is operating under safe parameters. In another embodiment, the battery protection module 412 may protect the battery 214 from a power surge from either of the media device 108 or the display device 106. The battery protection module 412 protects the battery 214 by limiting the voltage supplied to battery 214 by either blocking or shorting the current to reduce the voltage below a safe threshold. To accomplish this goal, the battery protection module 412 may include a surge protection circuit, such as an inductor, spark gap, discharge tube, Metal Oxide Varistors, etc. In an alternate embodiment, the battery protection module 412 may protect both the media device 108 and the battery 214 from a voltage spike from the display device 106.

In some embodiments, the battery management system 304 includes a battery communication module 414. The battery communication module 414 may communicate internally between the battery state monitor 406, the battery optimizer 408, the charging module 410, and the battery protection module 412. The battery communication module 414 may also communicate externally with the display device 106 and the media device 108. The battery communication module 414 communicates with the media device 108 to receive firmware updates and to provide the media device 108 with any of the data communicated to the communication module 414 from any of the battery state monitor 406, the battery optimizer 408, the charging module 410, and the battery protection module 412.

Method of Entering Low Power Mode that Conserves Energy

Figure 5:
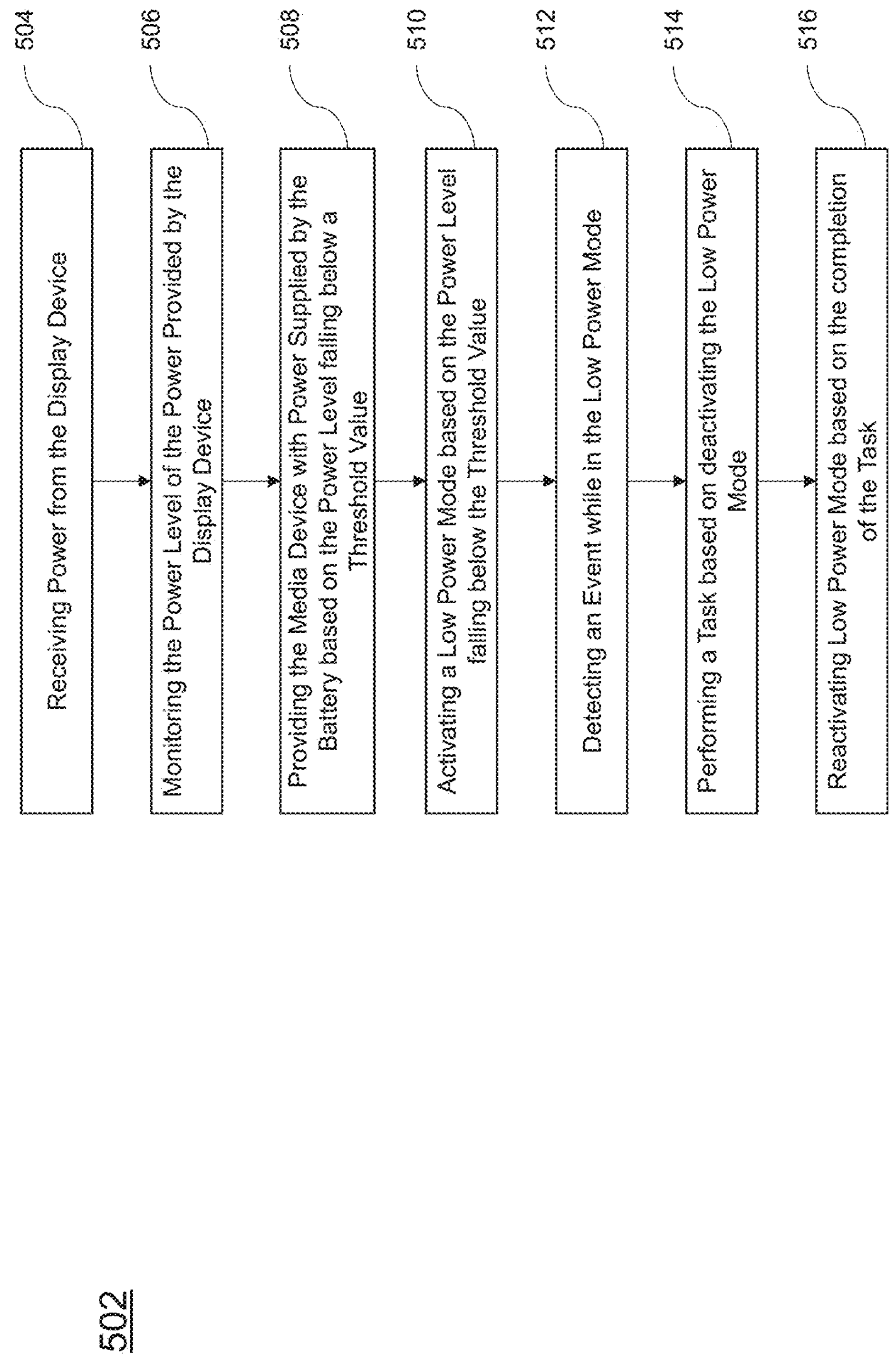
FIG. 5 illustrates a method of entering a low power mode, detecting an event, and performing a task using a backup battery, according to some embodiments.

FIG. 5 illustrates a method of entering a low power mode, detecting an event, and performing a task using the battery 214 as a backup.

At step 504, the media device 108 receives power from the display device 106. The power received from the display device 106 is provided to the port 220 of the media device 108.

At step 506, the processing module 206 monitors the power level of the power provided by the display device 106 to determine its value.

At step 508, the processing module 206 uses a threshold value to determine if the power level of the display device 106 has fallen below the threshold value. If the power level of the display device 106 has fallen below the threshold value, the processing module 206 communicates to the battery 214, such that the battery 214 provides power to the media device 108.

At step 510, the media device enters a low power mode after the power level of the display device falls below the threshold value. The low power mode of step 510 allows the media device 108 to operate basic tasks stored in the memory device 210 while the media device 108 is being powered by the batter 214. The low power mode of step 510 also allows the media device 108 to operate in lower power mode for between 24-48 hours while receiving power from the battery 214 because the media device 108 is operating only essential functions such as the memory device 210 and/or the processing module 206.

At step 512, the media device 108 refreshes the memory device 210 until the media device 108 detects an event. Once an event is detected, the media device 108 deactivates the low power mode.

At step 514, the media device 108 performs a task using the processing module 206.

At step 516, the media device 108 reactivates the low power mode upon completing the task performed in step 514.

Method of Scheduling, Downloading, and Installing an Update on the Media Device 108

Figure 6:
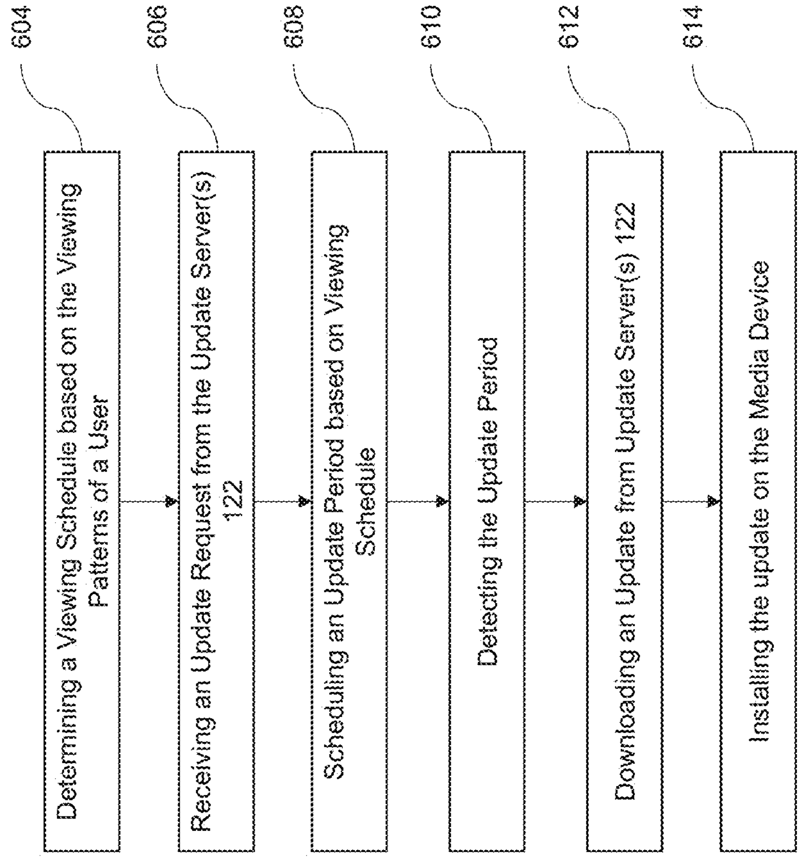
FIG. 6 illustrates a method of scheduling an update to the firmware of a media device, according to some embodiments.

FIG. 6 illustrates a method of scheduling an update to the firmware of a media device, according to some embodiments. Specifically, FIG. 6 illustrates a method of updating the media device 108 with the update. During the steps of FIG. 6, the media device 108 may be powered by the display device 106 or the battery 214 (although more specific battery powered embodiments are discussed below).

At step 604, the processing module 206 determines a viewing schedule based on the viewing patterns of the user 112. As discussed above, the viewing patterns of the user 112 represents a database stored in the memory device 210, which corresponds to when the user 112 is, and/or when the user 112 is predicted to be using the media device 108.

At step 606, the media device 108 receives an update request from the update servers 122.

At step 608, the media device 108 schedules an update period based on the viewing schedule. The update period corresponds to a period where the user 112 is not using the media device 108 or is predicted to not be using the media device 108. In another embodiment, the update period can correspond to a period where the user 112 is the least likely to use the media device 108.

At step 610, the media device 108 detects that the time of the update period has been reached.

At step 612, the media device 108 downloads a firmware update from the update servers 122.

At step 614, the media device 108 installs the firmware update on the media device 108.

Figure 7:
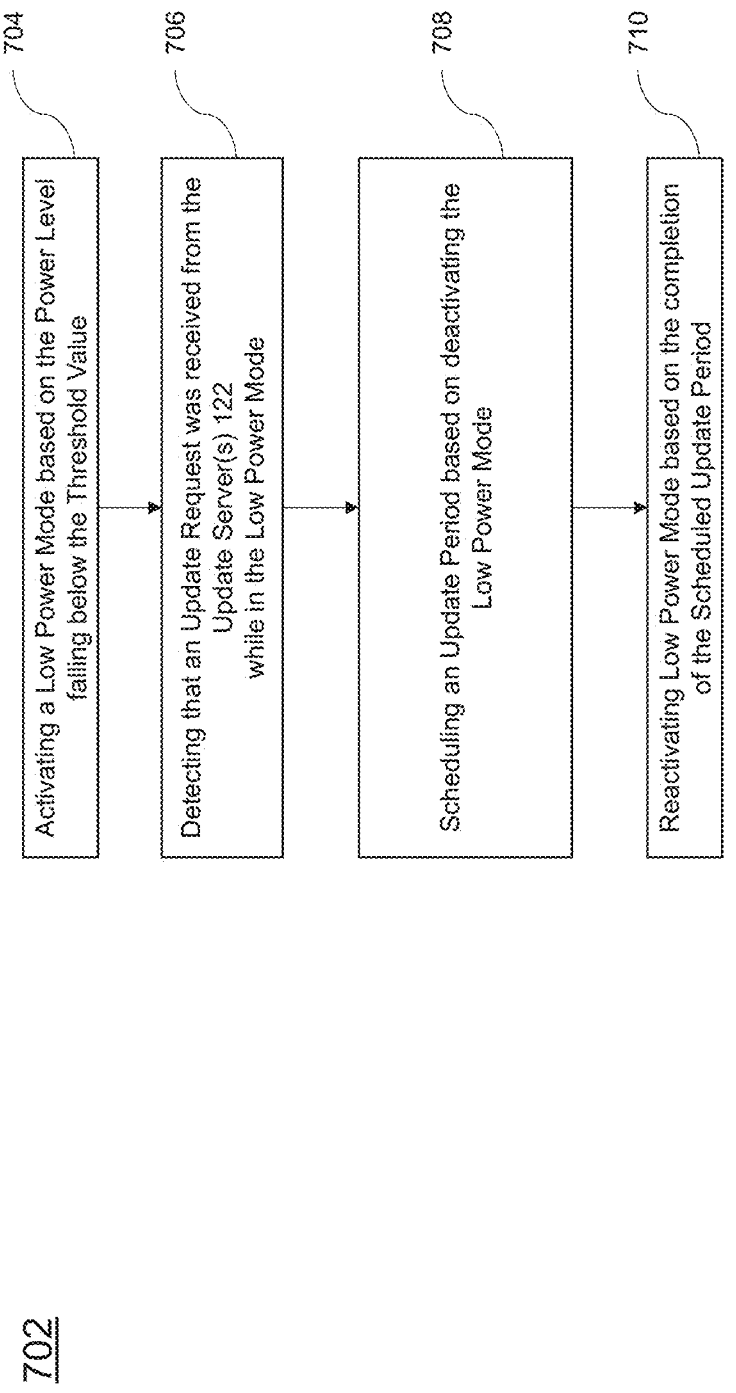
FIG. 7 illustrates a method of detecting an update request and scheduling an update period while in a low power mode using a backup battery, according to some embodiments.

Method of Updating the Firmware of the Media Device 108 that Conserves Energy FIG. 7 illustrates a method of detecting an update request and scheduling an update period while in a low power mode using the battery 214 as a backup, according to some embodiments. Specifically, FIG. 7 illustrates examples of steps 510-516, from FIG. 5, where the event detected by the media device 108 is the receipt of an update request from the update servers 122, and the task performed by the media device 108 is scheduling an update period based on deactivating the lower power mode.

At step 704, the media device enters a low power mode after the power level of the display device 106 falls below the threshold value. The low power mode of step 704 allows the media device 108 to operate basic tasks stored in the memory device 210 and/or processing module 206. The low power mode of step 704 also allows the media device 108 to operate in lower power mode for between 24-48 hours while receiving power from the battery 214 because the media device 108 is operating only essential components, such as the memory device 210 and/or the processing module 206.

At step 706, the media device 108 refreshes the memory device 210 until the media device 108 detects an update request from the update servers 122. Once an update request from the update servers 122 is detected, the media device 108 deactivates the low power mode.

At step 708, the media device 108 schedules an update period based on deactivation of the lower power mode using the processing module 206.

At step 710, the media device 108 reactivates the low power mode upon completing the scheduling an update period based on deactivating the lower power mode in step 708.

Figure 8:
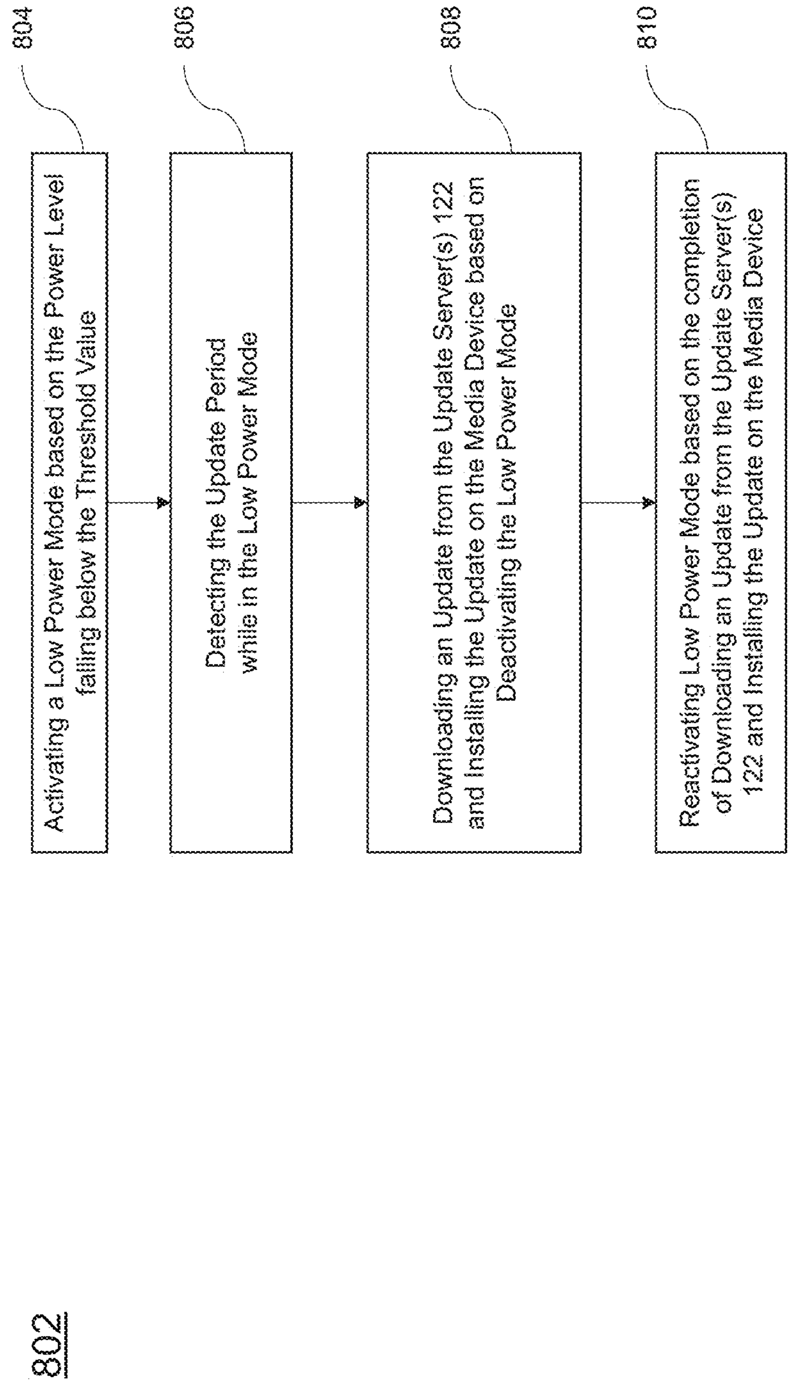
FIG. 8 illustrates a method of detecting an update period, downloading, and installing an update to firmware of a media device using backup battery, according to some embodiments.

FIG. 8 illustrates a method of detecting an update period, downloading, and installing an update to the firmware of a media device using the battery 214 as a backup. Similar to FIG. 7, FIG. 8 illustrates examples of steps 510-516 from FIG. 5. However, the event detected and the task performed is different. The event detected by the media device 108 is detecting the scheduled update period has been reached. While the task performed by the media device 108 is downloading an update from the update server(s) 122 and installing the update on the media device 108.

At step 804, the media device 108 enters a low power mode after the power level of the display device falls below the threshold value. The low power mode of step 804 allows the media device 108 to operate basic tasks stored in the memory device 210. The low power mode of step 804 also allows the media device 108 to operate in lower power mode for between 24-48 hours while receiving power from the battery 214 because the media device 108 is operating only the memory device 210 and/or processing module 206.

At step 806, the media device 108 refreshes the memory device 210 until the media device 108 detects the update period has been reached. Once the media device 108 detects that the update period has been reached, the media device 108 deactivates the low power mode.

At step 808, the media device 108 downloads an update from the update server(s) 122 and installs the update on the media device 108.

At step 810, the media device 108 reactivates the low power mode upon the completion of the download and installation of the update on the media device 108 in step 808.

Figure 9:
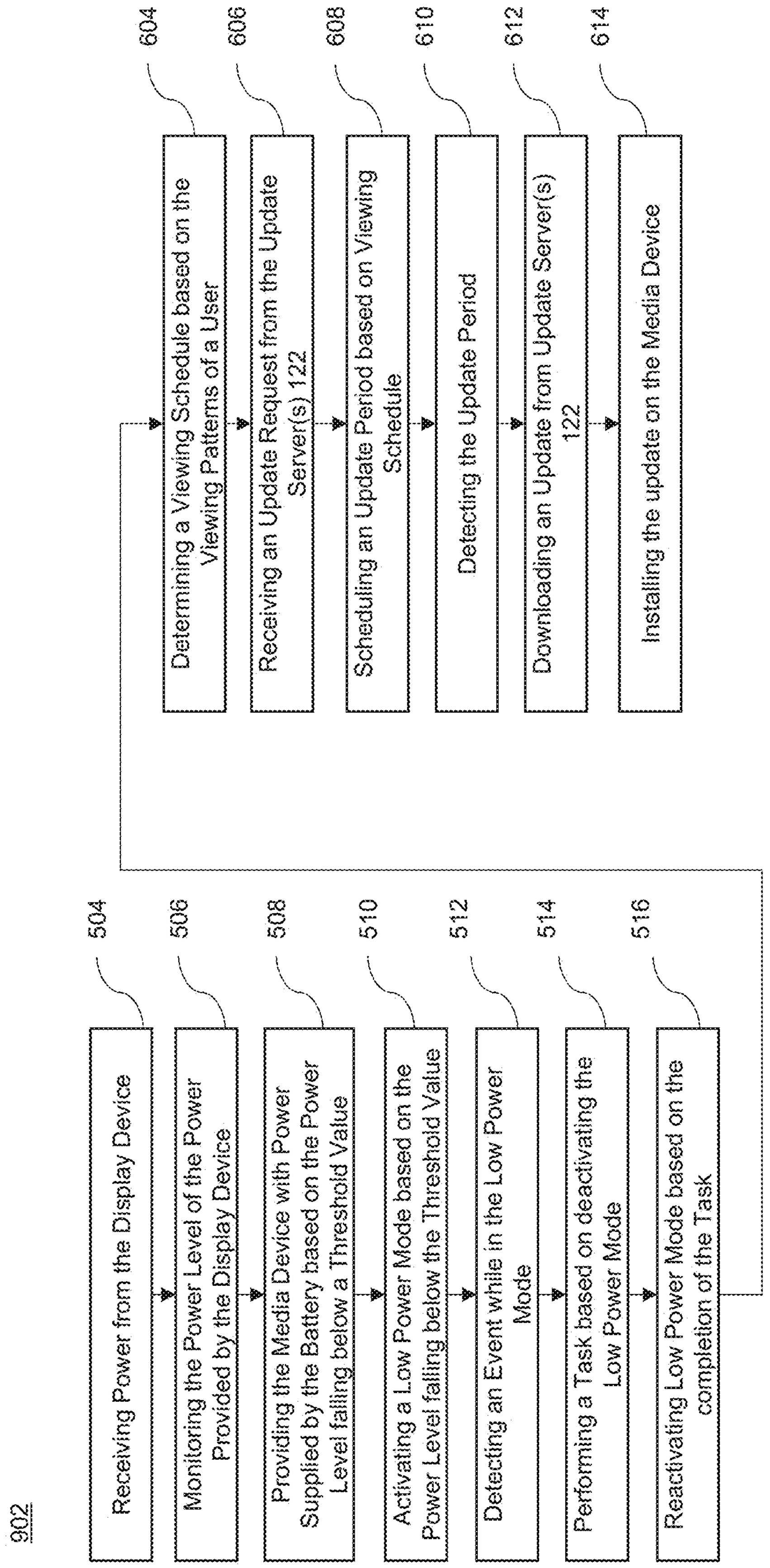
FIG. 9 illustrates a method of entering a low power mode, scheduling an update, downloading the update, and installing the update to firmware of a media device using a backup battery, according to some embodiments.

FIG. 9 illustrates a method of entering a low power mode, scheduling a firmware update, downloading the firmware update, and installing the firmware update to the media device 108 using the battery 214 as a backup, according to some embodiments. Specifically, FIG. 9 combines the method illustrated in FIG. 5 with the method illustrated in FIG. 6 by having steps 604-614 continue after steps 504-516. The method outlined in FIG. 9 is provided below. Furthermore, steps 704-710 from FIG. 7 and steps 804-810 from FIG. 8 are examples of the events detected and tasks performed by the method outlined in FIG. 9.

At step 504, the media device 108 receives power from the display device 106. The power received from the display device 106 is provided to the port 220 of the media device 108.

At step 506, the processing module 206 monitors the power level of the power provided by the display device 106 to determine its value.

At step 508, the processing module 206 uses a threshold value to determine if the power level of the display device 106 has fallen below the threshold value. If the power level of the display device 106 has fallen below the threshold value, the processing module 206 communicates to the battery 214, and the battery 214 provides power to the media device 108.

At step 510, the media device enters a low power mode after the power level of the display device falls below the threshold value. The low power mode of step 510 allows the media device 108 to operate basic tasks stored in the memory device 210. The low power mode of step 510 also allows the media device 108 to operate in lower power mode for between 24-48 hours while receiving power from the battery 214 because the media device 108 is operating only essential functions such as the memory device 210 and/or the processing module 206.

At step 512, the media device 108 refreshes the memory device 210 until the media device 108 detects an event. Once an event is detected, the media device 108 deactivates the low power mode.

At step 514, the media device 108 performs a task using the processing module 206. At step 516, the media device 108 reactivates the low power mode upon completing the task performed in step 514.

At step 604, the processing module 206 determines a viewing schedule based on the viewing patterns of the user 112. The viewing patterns of the user 112 represents a database stored in the memory device 210, which corresponds to when the user 112 is, and/or when the user 112 is predicted to be using the media device 108.

At step 606, the media device 108 receives an update request from the update servers 122.

At step 608, the media device 108 schedules an update period based on the viewing schedule. The update period corresponds to a period where the user 112 is not using the media device 108 or is predicted to not be using the media device 108. In another embodiment, the update period can correspond to a period where the user 112 is the least likely to use the media device 108.

At step 610, the media device 108 detects that the time of the update period has been reached.

At step 612, the media device 108 downloads a firmware update from the update servers 122.

At step 614, the media device 108 installs the firmware update on the media device 108.

Example Computer System

Figure 10:
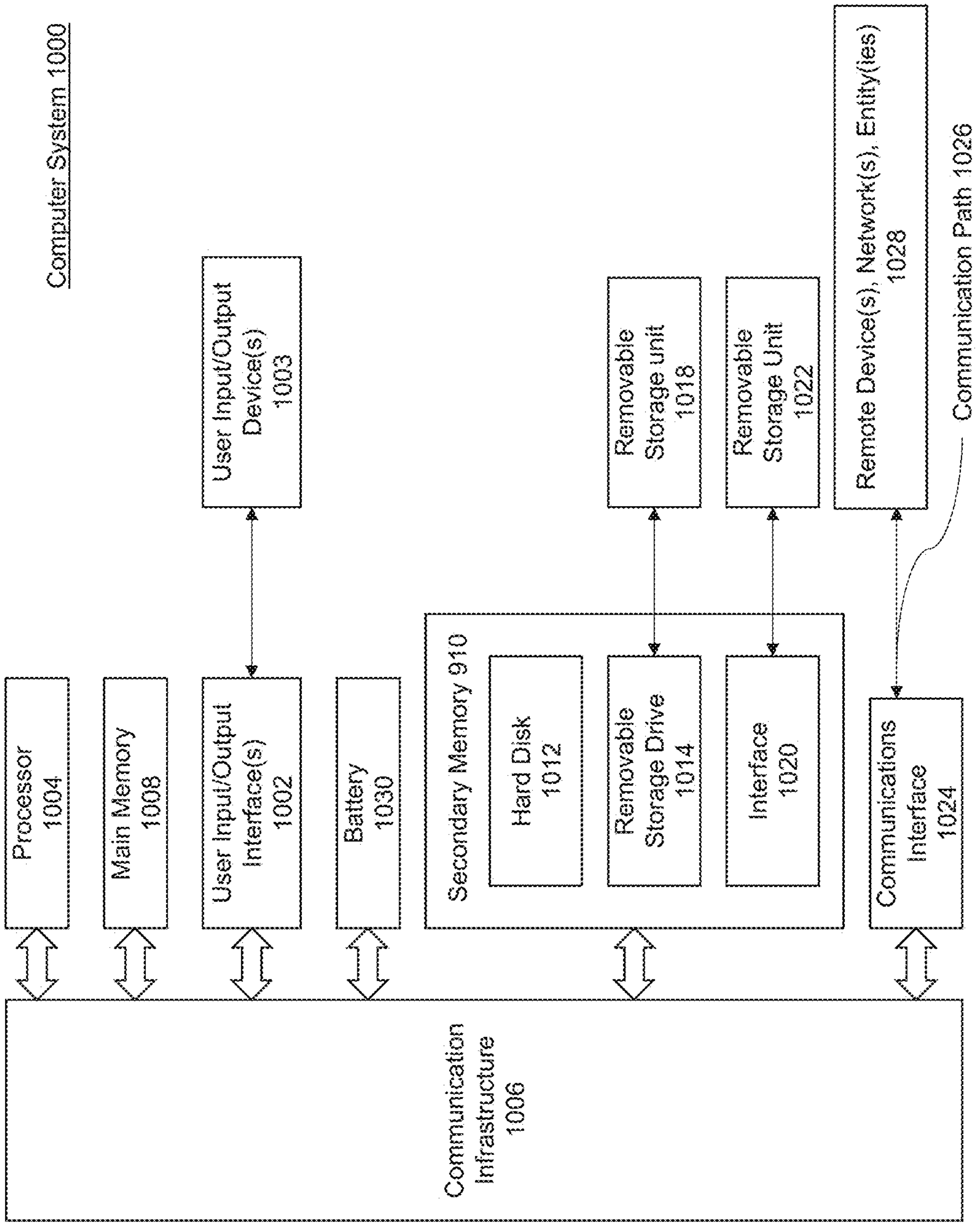
FIG. 10 illustrates an example computer system useful for implementing various embodiments.

Various embodiments and/or components therein can be implemented, for example, using one or more computer systems, such as computer system 1000 shown in FIG. 10. Computer system 1000 can be any computer or computing device capable of performing the functions described herein. For example, one or more computer systems 1000 can be used to implement any embodiments of FIGS. 1-9, and/or any combination or sub-combination thereof.

Computer system 1000 includes a processor (also called central processing unit, or CPU), such as a processor 1004. Processor 1004 is connected to a communication infrastructure or bus 1006.

One or more processors 1004 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 can include one or more levels of cache. Main memory 1008 has stored therein computer usable or readable storage device having stored thereon computer software (control logic) and/or data.

Computer system 1000 can also include one or more secondary storage devices or memory 1010. Secondary memory 1010 can include, for example, a hard disk drive 1012 and/or a removable storage device or drive 1014. Secondary memory 1010 has stored therein computer usable or readable storage device having stored thereon computer software (control logic) and/or data. Removable storage drive 1014 can be a floppy disk drive, a magnetic tape drive, a compact disk drive, an optical storage device, tape backup device, solid state drive, and/or any other storage device/drive. Removable storage drive 1014 has stored therein computer usable or readable storage device having stored thereon computer software (control logic) and/or data.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 can include other means, instrumentalities, or other approaches for allowing computer programs and/or other instructions and/or data to be accessed by computer system 1000. Such means, instrumentalities, or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 can further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 can allow computer system 1000 to communicate with remote devices 1028 over communications path 1026, which can be wired and/or wireless, and which can include any combination of LANs, WANs, the Internet, etc. Control logic and/or data can be transmitted to and from computer system 1000 via communication path 1026.

In some embodiments, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the preceding. Such control logic, when executed by one or more data processing devices (such as computer system 1000), causes such data processing devices to operate as described herein.

In some embodiments, computer system 1000 can further include a battery 1030 that is electrically and communicatively coupled to communication infrastructure 1006. The battery 1030 may supply power to one or more of the components of computer system 1000. The battery 1030 may be further configured to perform the various functions and methods disclosed above.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. The term "exemplary" means "serving as an example, instance, or illustration." The embodiments described herein are not limiting, but rather are exemplary only. It should be understood that the described embodiments are not necessarily to be construed as preferred or advantageous over other embodiments. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

In the detailed description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front,", "frontal", "back," and the like, are words of convenience and are not to be construed as limiting terms. The various data values (e.g., distances, seconds, etc.) provided herein may be substituted with one or more other predetermined data values and, therefore, should not be viewed limiting, but rather, exemplary. For this disclosure, the following terms and definitions shall apply:

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory device may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "memory device" means computer hardware or circuitry to store information for use by a processor. The memory device can be any suitable type of computer memory or any other type of electronic storage medium, such as, for example, read-only memory (ROM), erasable read-only memory (EROM), random access memory (RAM), dynamic random access memory (DRAM), static random access memory (SRAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. The memory device can be any transitory, or non-transitory computer readable medium.

The term "network" as used herein includes both networks and inter-networks of all kinds, including the Internet, and is not limited to any particular network or inter-network. Including, wired and/or wireless intranet, extranet, Internet, cellular, Bluetooth and/or any other short range, long range, local, regional, global communications network, as well as any combination thereof.

As used in the specification and claims, the singular form of the terms “a”, “an” and “the” include plural references unless the context clearly dictates otherwise.

The term “processor” means processing devices, apparatuses, programs, circuits, components, systems, and subsystems, whether implemented in hardware, tangibly embodied software, or both, and whether or not it is programmable. The term “processor” includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be electrically coupled to, or integrated with, a memory device.

The breadth and scope of this disclosure should not be limited by any of the above-described exemplary embodiments but should be defined only in accordance with the following claims and their equivalents.

What is claimed is:

1. A media device including a battery, comprising:

a memory;

the battery configured to provide power to the media device while the media device is in a low power mode;

at least one computer processor configured to:

cause the media device to enter the low power mode responsive to a detected event;

refresh the memory until receipt of an update request from an update server while the media device is in the low power mode;

deactivate the low power mode upon receipt of the update request;

schedule an update period for receiving an update from the update server responsive to receiving the update request and deactivating of the low power mode; and reactivate the low power mode subsequent to scheduling the update period.

2. The media device of claim 1, wherein the detected event comprises at least one of a power level of the media device following below a threshold power value.

3. The media device of claim 1, wherein when the media device is in the low power mode, the at least one computer processor is further configured to operate one or more basic tasks stored in the memory.

4. The media device of claim 1, wherein the at least one computer processor is further configured to:

determine a viewing schedule, wherein the viewing schedule is based on a viewing pattern of a user;

schedule an update period based on receiving the update request, wherein the update period is scheduled based on the viewing schedule;

download an update from the update server based on the update period; and install the update on the media device.

5. The media device of claim 1, wherein the battery comprises a charging module configured to limit a charging current supplied to battery cells of the battery.

6. The media device of claim 1, wherein the battery comprises a battery protection module configured to prevent the battery from operating outside of a predetermined safe operating zone.

7. The media device of claim 1, wherein the media device is configured to connect to a display device, and wherein the media device is further configured to receive power via a wired connection from the display device.

8. A method of updating a media device comprising a processor and a battery and wherein the battery is configured to supply power to the media device while the media device is in a low power mode, the method comprising:

causing the media device to enter the low power mode responsive to a detected event;

refreshing a memory until receipt of an update request from an update server while the media device is in the low power mode;

deactivating the low power mode upon receipt of the update request;

scheduling an update period for receiving an update from the update server responsive to receiving the update request and deactivating of the low power mode; and reactivating the low power mode subsequent to scheduling the update period.

9. The method of claim 8, wherein the detected event comprises at least one of a power level of the media device following below a threshold power value.

10. The method of claim 8, wherein when the media device is in the low power mode, the method further comprises operating one or more basic tasks stored in the memory.

11. The method of claim 8, further comprising:

determining a viewing schedule, wherein the viewing schedule is based on a viewing pattern of a user;

scheduling an update period based on receiving the update request, wherein the update period is scheduled based on the viewing schedule;

downloading an update from the update server based on the update period; and installing the update on the media device.

12. The method of claim 8, wherein the battery comprises a charging module configured to limit a charging current supplied to battery cells of the battery.

13. The method of claim 8, wherein the battery comprises a battery protection module configured to prevent the battery from operating outside of a predetermined safe operating zone.

14. The method of claim 8, wherein the media device is configured to connect to a display device, and wherein the media device is further configured to receive power via a wired connection from the display device.

15. A non-transitory computer-readable medium having instructions stored thereon that, when executed by at least one media device that comprises a processor and a battery, cause the at least one media device to perform operations comprising:

causing the at least one media device to enter a low power mode responsive to a detected event;

refreshing a memory until receipt of an update request from an update server while the at least one media device is in the low power mode;

deactivating the low power mode upon receipt of the update request;

scheduling an update period for receiving an update from the update server responsive to receiving the update request and deactivating of the low power mode; and reactivating the low power mode subsequent to scheduling the update period.

16. The non-transitory computer-readable medium of claim 15, wherein the detected event comprises at least one of a power level of the at least one media device following below a threshold power value.

17. The non-transitory computer-readable medium of claim 15, wherein when the at least one media device is in the low power mode, the operations further comprise operating one or more basic tasks stored in the memory.

18. The non-transitory computer-readable medium of claim 15, wherein the instructions, when executed by the processor, further cause the media device to perform operations comprising:

determining a viewing schedule, wherein the viewing schedule is based on a viewing pattern of a user;

scheduling the update period based on receiving the update request, wherein the update period is scheduled based on the viewing schedule;

downloading an update from the update server based on the update period; and installing the update on the at least one media device.

19. The non-transitory computer-readable medium of claim 15, wherein the at least one media device is configured to connect to a display device, and wherein the at least one media device is further configured to receive power via a wired connection from the display device.

20. The non-transitory computer-readable medium of claim 15, wherein the battery comprises a charging module configured to limit a charging current supplied to battery cells of the battery.

* * * * *